(12) United States Patent
Lai et al.

(10) Patent No.: US 11,381,912 B2
(45) Date of Patent: Jul. 5, 2022

(54) METHOD AND AUDIO RECEIVER CAPABLE OF EFFECTIVELY REDUCING OR AVOIDING CURRENT NOISE

(71) Applicant: Realtek Semiconductor Corp., HsinChu (TW)

(72) Inventors: Chao-Min Lai, HsinChu (TW); Guo-Yuan Luo, HsinChu (TW); Chia-Hao Wu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/210,439

(22) Filed: Mar. 23, 2021

(65) Prior Publication Data

US 2022/0078550 A1    Mar. 10, 2022

(30) Foreign Application Priority Data

Sep. 8, 2020  (TW) .................................. 109130722

(51) Int. Cl.
*H04R 3/00* (2006.01)
*G06F 3/16* (2006.01)
*H04R 3/02* (2006.01)

(52) U.S. Cl.
CPC ........ *H04R 3/02* (2013.01); *G06F 3/16* (2013.01)

(58) Field of Classification Search
CPC ........ H04R 3/00; H04R 3/02; H04R 2203/00; H04R 2420/00; H04R 2420/01; H04R 2420/09; H04R 2430/00; G06F 3/16; G06F 3/162

See application file for complete search history.

(56) References Cited

U.S. PATENT DOCUMENTS

| | | | |
|---|---|---|---|
| 5,745,859 A * | 4/1998 | Takenaka | H04M 1/6058 455/575.2 |
| 9,729,964 B2 * | 8/2017 | Hogan | H04R 3/00 |
| 2014/0093103 A1 * | 4/2014 | Breece, III | H03F 1/26 381/120 |
| 2020/0334191 A1 | 10/2020 | Lai et al. | |

FOREIGN PATENT DOCUMENTS

| | | | |
|---|---|---|---|
| JP | 2005287770 A | * | 10/2005 |
| TW | 201933888 A | | 8/2019 |

\* cited by examiner

*Primary Examiner* — Thang V Tran
(74) *Attorney, Agent, or Firm* — Winston Hsu

(57) ABSTRACT

An audio receiver includes a first signal port, a second signal port, a power supply port, a power ground port, and an amplifier circuit. The first signal port is coupled to an audio signal line of a transmission interface. The second signal port is coupled to an audio ground line of the transmission interface. The power supply port is coupled to a power supply line of the transmission interface to generate a power supply level to the power supply line. The power ground port is connected to the ground level and to a power ground line of the transmission interface. When the audio receiver is outputting a power supply current to the audio source device through the power supply port via the power supply line, a connection state between the second signal port and the power ground port is at a high impedance state.

9 Claims, 3 Drawing Sheets

METHOD AND AUDIO RECEIVER CAPABLE OF EFFECTIVELY REDUCING OR AVOIDING CURRENT NOISE

BACKGROUND OF THE INVENTION

1. Field of the Invention

The present invention relates to a mechanism for canceling current noise, and more particularly, to an audio receiver and a method capable of effectively canceling or avoiding current noise.

2. Description of the Prior Art

In general, when an audio source device is connected to an audio speaker through a transmission interface to play an audio signal of the audio source device through the audio speaker, the audio speaker can usually output current through the transmission interface to charge the audio source device. However, after the output power current passes through a line of the transmission interface, a noise signal (so-called current noise) is very easily generated, and the current noise will appear in the audio transmission signal path/line between the audio source device and the audio speaker to affect the audio quality. Even if the audio source device is powered by another external power source and is not charged by the audio speaker, such current noise will appear in the audio transmission signal path/line between the audio source device and the audio speaker.

SUMMARY OF THE INVENTION

One of the objectives of the present invention is to provide an audio receiver and a method that can effectively cancel or avoid current noise, to solve the aforementioned problems.

An embodiment of the present invention discloses an audio receiver for being coupled to an audio source device through a transmission interface. The audio receiver includes a first signal port, a second signal port, a power supply port, a power ground port and an amplifier circuit. The first signal port is configured to be coupled to an audio signal line of the transmission interface to receive an audio input signal of the audio source device. The second signal port is configured to be coupled to an audio ground line of the transmission interface, to connect to an audio ground level of the audio source device through the audio ground line of the transmission interface. The power supply port is configured to be coupled to a power supply line of the transmission interface, to generate a power supply level to the power supply line. The power ground port is configured to be connected to a ground level and coupled to a power ground line of the transmission interface, to be coupled to a ground level of the audio source device. The amplifier circuit has a first input terminal coupled to the first signal port to receive the audio input signal, and has a second input terminal coupled to the second signal port to connect to the audio ground level through the audio ground line, and has an output terminal configured to generate an amplified audio signal according to the audio input signal and the audio ground level. The amplified audio signal can be played by the audio receiver. When the audio receiver is outputting a power supply current to the audio source device through the power supply port via the power supply line, a connection state between the second signal port and the power ground port is at a high impedance state.

An embodiment of the present invention further discloses an audio receiver for being coupled to an audio source device through a transmission interface. The audio receiver includes a first signal port, a second signal port, a power supply port, a power ground port and an amplifier circuit. The first signal port is configured to be coupled to an audio signal line of the transmission interface to receive an audio input signal of the audio source device. The second signal port is configured to be coupled to an audio ground line of the transmission interface, to connect to an audio ground level of the audio source device through the audio ground line of the transmission interface. The power supply port is configured to be coupled to a power supply line of the transmission interface, to generate a power supply level to the power supply line. The power ground port is configured to be connected to a ground level and coupled to a power ground line of the transmission interface, to be coupled to a ground level of the audio source device. The amplifier circuit has a first input terminal coupled to the first signal port to receive the audio input signal, and has a second input terminal coupled to the second signal port to connect to the audio ground level through the audio ground line, and has an output terminal configured to generate an amplified audio signal according to the audio input signal and the audio ground level. The amplified audio signal can be played by the audio receiver, when the power supply port of the audio receiver is not outputting a power supply current and the audio receiver does not detect any audio input signal on the first signal port, a connection state between the second signal port and the power ground port is at a low impedance state to dissipate a voltage level of the second signal port to the ground level.

An embodiment of the present invention further discloses a method for an audio receiver. The audio receiver is configured to be coupled to an audio source device through a transmission interface. The method includes: providing a first signal port that is coupled to an audio signal line of the transmission interface to receive an audio input signal of the audio source device; providing a second signal port that is coupled to an audio ground line of the transmission interface, to connect to an audio ground level of the audio source device through the audio ground line of the transmission interface; providing a power supply port that is coupled to a power supply line of the transmission interface, to generate a power supply level to the power supply line; providing a power ground port that is connected to a ground level and coupled to a power ground line of the transmission interface, to be coupled to a ground level of the audio source device; providing an amplifier circuit, using a first input terminal of the amplifier circuit to receive the audio input signal, using a second input terminal of the amplifier circuit to connect to the audio ground level through the audio ground line, and generating an amplified audio signal according to the audio input signal and the audio ground level, wherein the amplified audio signal can be played by the audio receiver; and when the audio receiver is outputting a power supply current to the audio source device through the power supply port via the power supply line, controlling a connection state between the second signal port and the power ground port to be at a high impedance state.

An embodiment of the present invention further discloses a method for an audio receiver. The audio receiver is configured to be coupled to an audio source device through a transmission interface. The method includes: providing a first signal port that is coupled to an audio signal line of the transmission interface to receive an audio input signal of the audio source device; providing a second signal port that is coupled to an audio ground line of the transmission interface, to connect to an audio ground level of the audio source device through the audio ground line of the transmission interface; providing a power supply port that is coupled to a power supply line of the transmission interface, to generate a power supply level to the power supply line; providing a power ground port that is connected to a ground level and coupled to a power ground line of the transmission interface, to be coupled to a ground level of the audio source device; providing an amplifier circuit, using a first input terminal of the amplifier circuit to receive the audio input signal, using a second input terminal of the amplifier circuit to connect to the audio ground level through the audio ground line, and generating an amplified audio signal according to the audio input signal and the audio ground level, wherein the amplified audio signal can be played by the audio receiver; and when the power supply port of the audio receiver is not outputting a power supply current and the audio receiver does not detect any audio input signal on the first signal port, controlling a connection state between the second signal port and the power ground port being to be at a low impedance state to dissipate a voltage level of the second signal port to the ground level.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
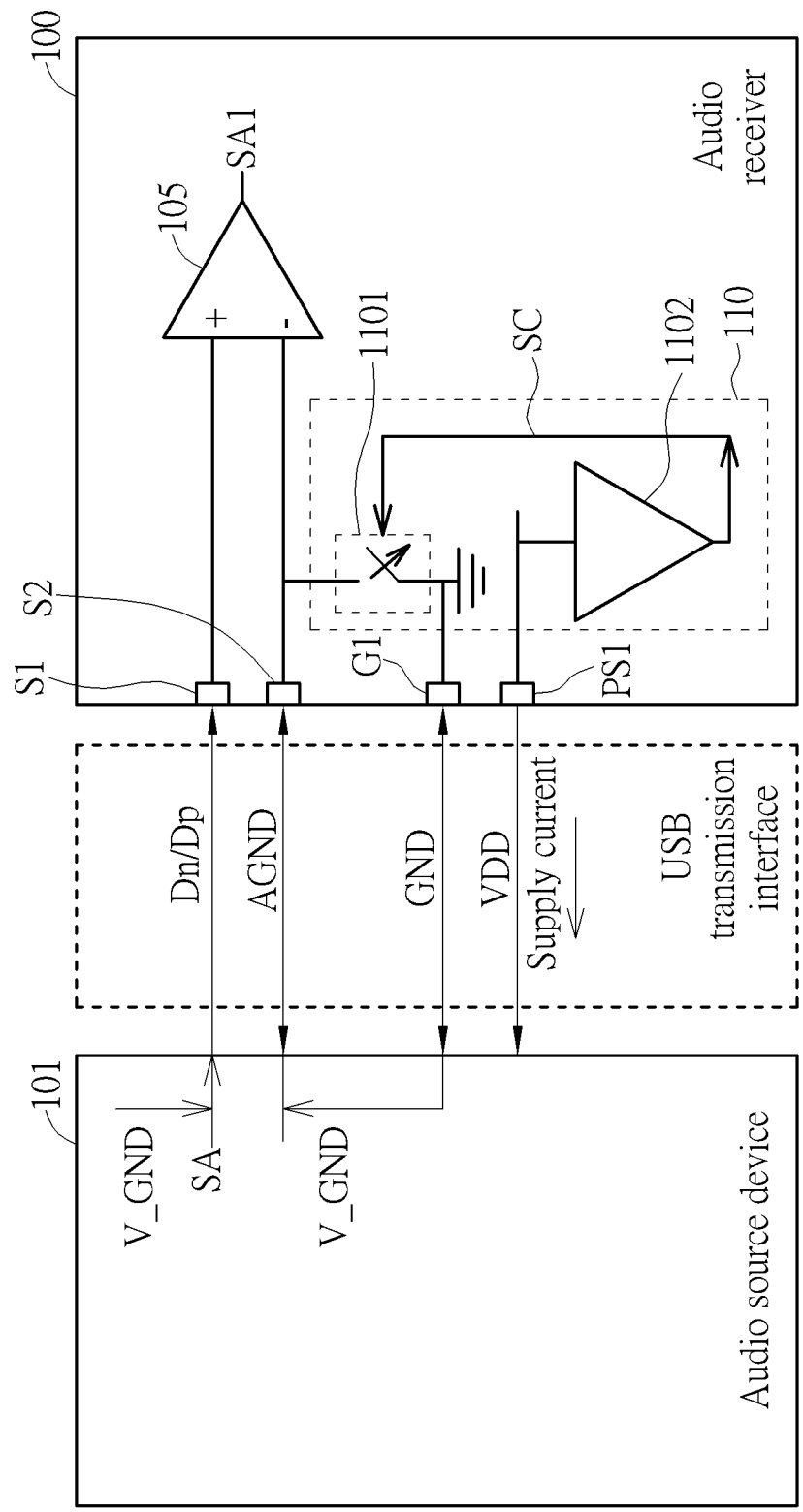
FIG. 1 is a block diagram illustrating an audio receiver capable of cancelling current noise according to an embodiment of the present invention.

Please refer to FIG. 1. FIG. 1 is a block diagram illustrating an audio receiver 100 (also known as an audio speaker) capable of cancelling current noise according to an embodiment of the present invention. As shown in FIG. 1, the audio receiver 100 is configured to couple to an audio source device 101 through a transmission interface. An example of the transmission interface may be a universal serial bus (USB) transmission interface, such as a USB-C (Type-C) transmission interface that includes multiple signal lines/ports/pins, but the present invention is not limited thereto. An example of the audio source device 101 may be a portable electronic device, such as a tablet device (but not limited to), and an example of the audio receiver 100 may be an audio amplifier connected to an external power source. In the present embodiment, when the audio source device 101 is connected to the audio receiver 100 through a USB transmission interface, the audio receiver 100 can use the external power source and indirectly charge the audio source device 101 through the USB transmission interface. It should be noted that the audio source device 101 may also be charged by another external power source or its own battery.

The audio source device 101 generates and outputs one or more audio input signals SA. The one or more audio input signals SA, for example, respectively correspond to one or more different audio channels, and are transmitted to the audio receiver 100 through the audio signal lines (ports/pins) Dn/Dp (but not limited to) of the USB transmission interface, such that after the audio receiver 100 receives the one or more audio input signals SA, the one or more audio input signals SA may be amplified to generate one or more amplified audio signals SA1 (respectively corresponding to one or more different audio channels) to play audio to a user.

In practice, the audio receiver 100 includes one or more first signal ports S1, a second signal port S2, a power supply port PS1, a power ground port G1, and one or more amplifier circuits 105 (e.g., a differential amplifier circuit) and a noise canceling circuit 110. The one or more first signal ports S1 mean, for example, one or more audio pins corresponding to one or more different audio channels, and the one or more amplifier circuits 105 mean, for example, one or more audio amplifiers and also respectively correspond to one or more different audio channels. For example, in a case of a mono audio channel, the audio input signal SA is a mono audio signal that passes through a first signal port S1 and is amplified by one amplifier circuit 105 to generate an amplified audio signal SA1. Taking the left and right audio channels (stereo audio channels) as an example, the audio receiver 100 includes, for example, two first signal ports S1 and two amplifier circuits 105. The two first signal ports S1 respectively receive two audio input signals SA corresponding to the left and right audio channels (stereo audio channels), the two audio input signals SA are respectively transmitted to differential input terminals (e.g., non-inverting input terminals) of respective amplifier circuits 105, and the two amplifier circuits 105 respectively amplify the two audio input signals SA to generate two amplified audio signals SA1. Since other multi-channel audio receiving and amplification processing operations and structures are similar, further description is not repeated for brevity.

The second signal port S2 is configured to connect to an audio ground level of the audio source device 101 through the audio ground line AGND of the USB transmission interface. The power supply port PS1 is coupled to a power supply port of the audio source device 101 through the power supply line VDD of the USB transmission interface, and is configured to generate a power supply level to the audio source device 101 to output a supply current for charging the audio source device 101. The power ground port G1 is used to connect a ground level of the audio source device 101 through the power ground line GND of the USB transmission interface. When the audio source device 101 is charged by the audio receiver 100, the audio ground level of the audio source device 101 is connected to the ground level, so as to be the same level.

The amplifier circuit 105 is, for example, an audio differential amplifier. The amplifier circuit 105 has a first input terminal (e.g., a non-inverting input terminal) coupled to the first signal port S1 to receive the audio input signal SA through the audio signal line Dn/Dp of the USB transmission interface, and further has a second input terminal (e.g., a reverse input terminal) coupled to the second signal port S2 that is connected to the audio ground level of the audio source device 101 through the audio ground line AGND of the USB transmission interface, and further has an output terminal configured to generate an amplified audio signal SA1 according to the audio input signal SA and the audio ground level, such as an amplified left channel audio signal or an amplified right channel audio signal.

The noise canceling circuit 110 is coupled to the second signal port S2, the power supply port PS1 and the power ground port G1, and is configured to dynamically determine the noise canceling method according to different conditions of the power supply provided to the audio source device 101 (e.g., whether or not the audio source device is currently being charged), such that the audio noise can be canceled both when the audio source device 101 is charged and when the audio source device 101 is not charged, thereby preventing noise of the receiver from being fed back to the audio signal of the audio source when the audio source device 101 is charged and reducing the local audio noise of the audio source 101 when the audio source device 101 is not charged.

In practice, the noise canceling circuit 110 includes a switch circuit 1101 and a current sensing circuit 1102. The switch circuit 1101 is coupled between the second signal port S2 and the power ground port G1 (and a ground level). The switch circuit 1101 can be implemented by, for example, a transistor. The operation of setting a turn-on state and a turn-off state of the transistor that respectively make the switch circuit 1101 (that is, a connection state between the second signal port S2 and the power ground port G1) be at a low impedance state (e.g., a closed state) and at a high impedance state (e.g., an open state) is controlled by a control signals SC generated by the current sensing circuit 1102, where the current sensing circuit 1102 has a sensing input terminal coupled to the power supply port PS1 for detecting whether the supply current is outputted (i.e., detecting whether there is a current passing through) and further has a sensing output terminal for generating the control signal SC to control the switch Circuit 1101.

As shown in FIG. 1, when the audio receiver 100 outputs a supply current through the power supply port PS1 and the power supply line VDD of the USB transmission interface to charge the audio source device 101, the current sensing circuit 1102 detects a current passing through its sensing input terminal and being outputted from the power supply port PS1, and the current sensing circuit 1102 generates and outputs a control signal SC at the sensing output terminal to the switch circuit 1101 for controlling the switch circuit 1101 to be at the high impedance state to disconnect the second signal port S2 from the power ground port G1, such that the audio ground line AGND from the USB transmission interface and a signal level received by the second signal port S2 do not be coupled to the ground level. For example, in this case, the second signal port S2 may be not connected to the power ground port G1 and be in a floating state to prevent the voltage level of the second signal port S2 form being coupled to the ground level. Alternatively, in another embodiment, the switch circuit 1101 is implemented by a transistor. When the switch circuit 1101 is controlled to be in the open state, there may actually be a slight leakage current passing through the transistor. In this case, the transistor is controlled to be at the high impedance state, such that the second signal port S2 is connected to the power ground port G1 through higher or relatively high impedance, which can also prevent the voltage level of the second signal port S2 from dissipating to the ground level.

When the audio receiver 100 does not output the supply current through the power supply port PS1 (equivalent to no current output), the current sensing circuit 1102 may generate and output a control signal SC at its sensing output terminal to control the switch circuit 1101 to be at the low impedance state to establish the connection between the second signal port S2 and the power ground port G1, such that the voltage level of the second signal port S2 is coupled to the ground level. Alternatively, in another embodiment, the switch circuit 1101 is implemented by a transistor. When the switch circuit 1101 is controlled to be in the closed state, the transistor is actually controlled to be at a low impedance state, such that the second signal port S2 is connected to the power ground port G1 through lower or relatively low impedance.

In the embodiment shown in FIG. 1, the audio source device 101 is not charged by any external power source, but is charged by the audio receiver 100 through, for example, a USB-C transmission interface (but not limited thereto). The audio receiver 100 outputs the supply current through the power supply port PS1 to charge the audio source device 101. Since the USB transmission interface line has line resistance (impedance), passing the supply current through the power supply line VDD of the USB transmission interface is equivalent to inducing a noise voltage V_GND on the power ground line GND, which is also called current noise. The noise voltage V_GND will be added to one or more audio input signals SA and added to the audio ground level coupled to the audio ground line AGND of the USB transmission interface, as shown in FIG. 1. Therefore, the noise voltage V_GND is transmitted to the audio receiver 100 through the USB transmission interface with the audio input signal SA and the voltage of the audio ground level. In this case, the control signal SC controls the switch circuit 1101 to be in the open state to disconnect the second signal port S2 from the power ground port G1, or to use the high impedance connection mentioned in the previous paragraph to separate the second signal port S2 from the power ground port G1. Therefore, the noise voltage V_GND transmitted along with the voltage of the audio ground level is not coupled to or dissipated to a ground level after being received by the second signal port S2, such that the noise voltage V_GND in this situation exists at both input terminals of the differential amplifier circuit 105. Therefore, on the basis of the principle mechanism of the differential amplifier, the differential amplifier circuit 105 can use the noise voltage V_GND on the inverting input terminal to cancel the noise voltage V_GND that is transmitted alone with the audio input signal SA on the non-inverting input terminal, to obtain the audio input signal SA without current noise (that is, the noise voltage V_GND). In this way, the current noise can be effectively canceled.

Figure 2:
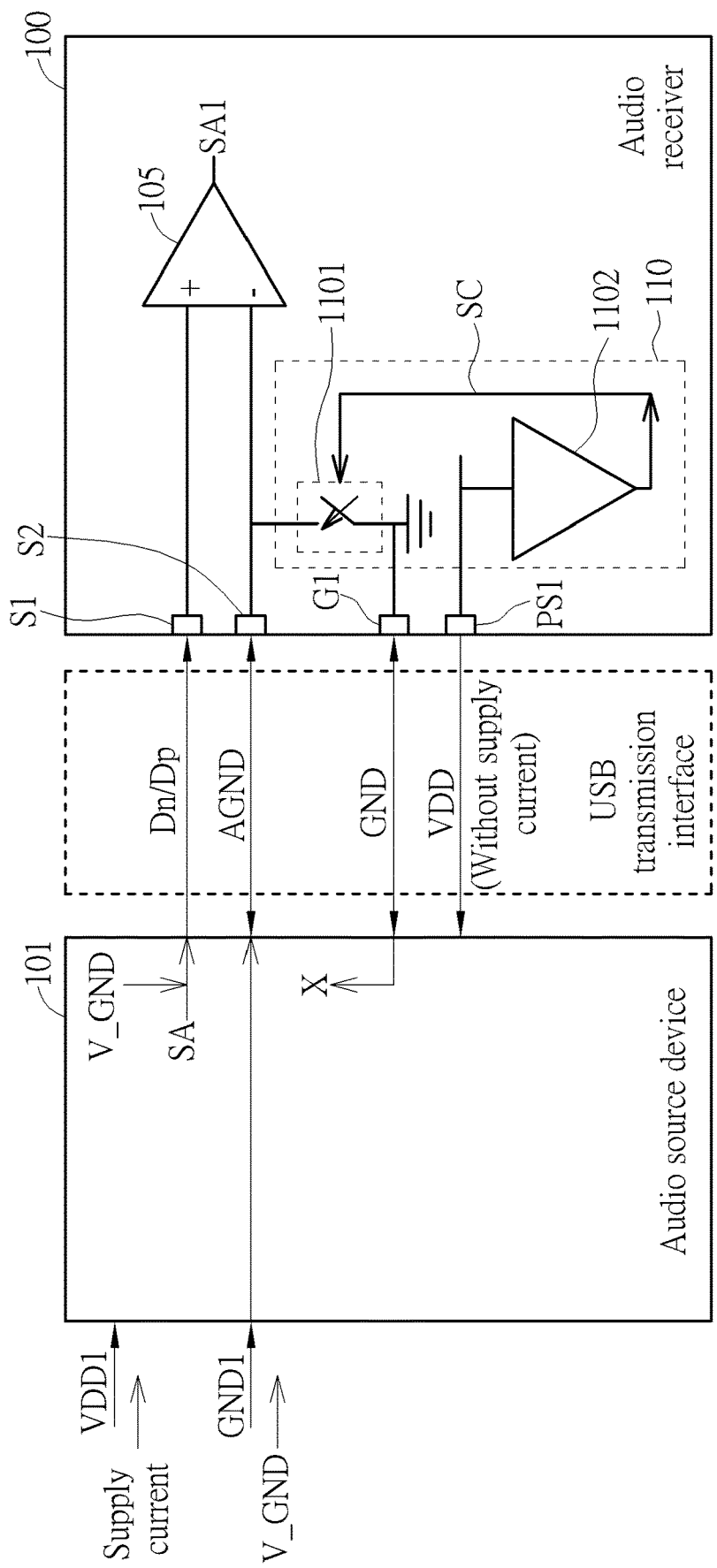
FIG. 2 is a block diagram illustrating the audio receiver shown in FIG. 1 not being charged.

Please refer to FIG. 2. FIG. 2 is a block diagram illustrating the audio receiver 100 shown in FIG. 1 not being charged. As shown in FIG. 2, the audio source device 101 is charged by, for example, a supply current on the external power supply line VDD1, where the line GND1 may be a power ground line corresponding to the external power supply line VDD1. However, the present invention is not limited thereto. The audio source device 101 may be charged by its battery. In the embodiment shown in FIG. 2, the audio source device 101 is charged by the external power source instead of being charged by the audio receiver 100 through, for example, a USB transmission interface. Therefore, the line resistance of the USB transmission interface does not generate current noise. However, the supply current of the external power supply line will generate current noise on the audio ground line AGND and audio signal line Dn/Dp of the USB transmission interface. When a circuit component (for example, but not limited to, a digital-to-analog converter) inside the audio source device 101 for audio processing of the audio signal is not turned off, current noise exists at the non-inverting input terminal and the inverting input terminal of the amplifier circuit 105 of the audio receiver 100, respectively. Therefore, on the basis of the principle mechanism of the differential amplifier, the differential amplifier circuit 105 can use the noise voltage V_GND on the inverting input terminal to cancel the noise voltage V_GND that is transmitted along with the audio input signal SA on the non-inverting input terminal, to obtain the audio input signal SA without current noise (that is, the noise voltage V_GND). In this way, the current noise can be effectively canceled. It should be noted that, at this moment, when the audio receiver 100 detects an audio input signal existing at the first signal port S1, the audio receiver 100 controls the switch circuit 1101 to be in the open state (or the high impedance state). In addition, since the digital-to-analog converter is turned off, the current noise on the first signal port S1 will disappear. Therefore, in order to cancel the current noise on the second signal port S2, the audio receiver 100 controls the switch circuit 1101 to be in the close state (or the low impedance state), such that the current noise on the second signal port S2 disappears through the low impedance path of the switch circuit 1101. In practice, when the switch circuit 1101 is implemented by a transistor, the transistor is controlled by the control signal SC to be conductive to form a low impedance path connected to the ground level. That is, when the audio receiver 100 does not output the supply current through the power supply port PS1, which is equivalent to no current output, and the audio input signal is not detected at the first signal port S1, the current sensing circuit 1102 generates and outputs the control signal SC at its sensing output terminal to control the switch circuit 1101 to be in the closed state (or the low impedance state) for establishing the connection between the second signal port S2 and the power ground port G1, such that the current noise received on the second signal port S2 disappears because of the coupling to the ground level. In this way, the current noise can be effectively canceled.

Figure 3:
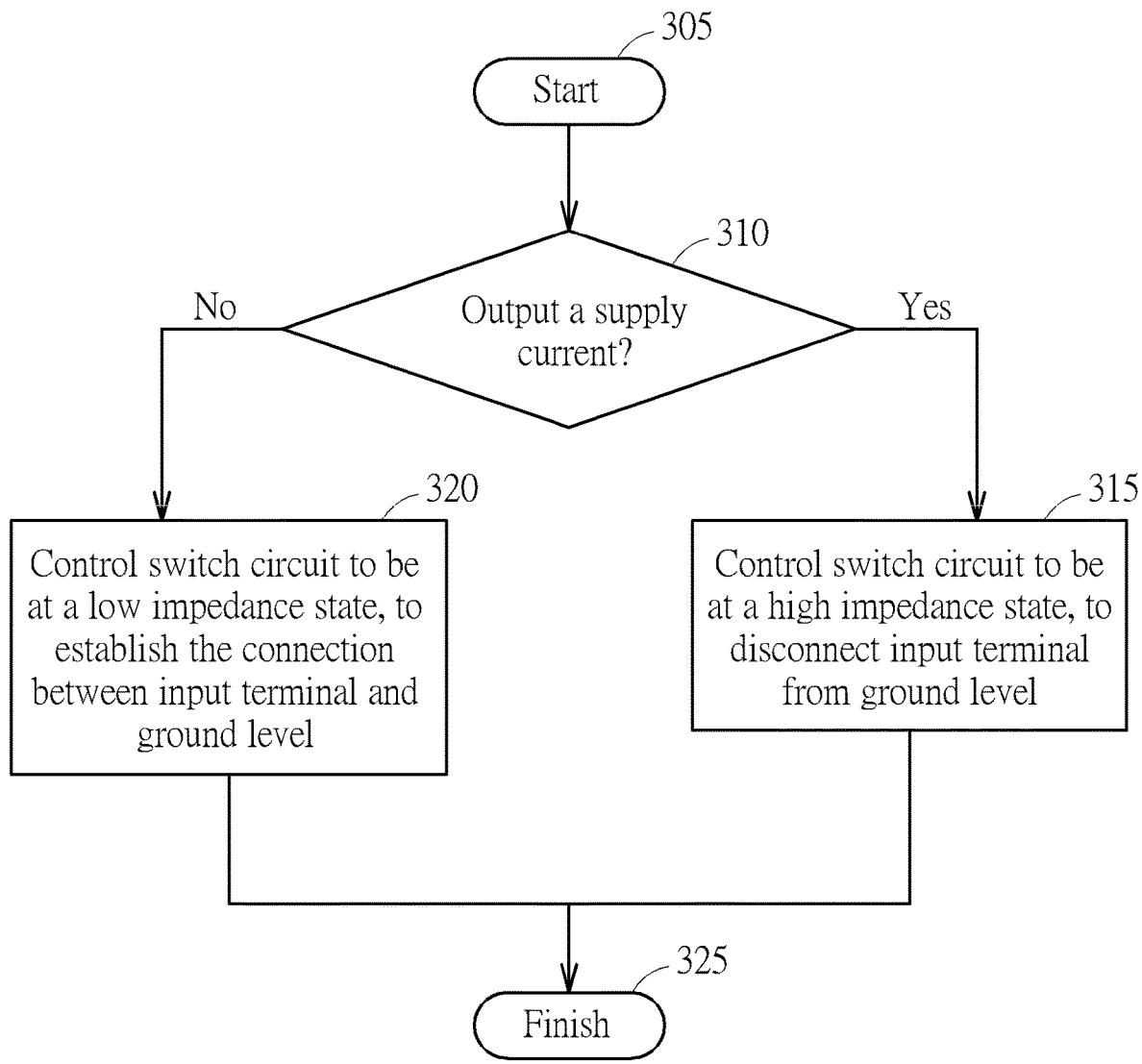
FIG. 3 is a flow chart illustrating a method for performing current noise cancellation based on different charging states according to an embodiment of the present invention.

Refer to FIG. 3, which is a flowchart illustrating the method for performing current noise cancellation based on different charging states according to an embodiment of the present invention. The method of the present invention includes the following steps:

Step 305: Start;

Step 310: A current sensing circuit detects whether the audio receiver outputs a supply current to an audio source device through a power supply port. If the supply current is outputted, the flow proceeds with step 315; otherwise, the flow proceeds with step 320;

Step 315: The current sensing circuit outputs a control signal SC to control a switch circuit arranged between an input terminal of an amplifier circuit and a ground level to be at a high impedance state, for example, to disconnect the input terminal of the amplifier circuit from the ground level for preventing the noise voltage corresponding to current noise from disappearing through the ground level;

Step 320: The current sensing circuit outputs the control signal SC to control the switch circuit arranged between the input terminal of the amplifier circuit and the ground level to be at a low impedance state, to establish the connection between the input terminal of the amplifier circuit and the ground level, such that the noise voltage corresponding to the current noise disappears through the ground level; and Step 325: Finish.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An audio receiver, for being coupled to an audio source device through a transmission interface, the audio receiver comprising:

a first signal port, configured to be coupled to an audio signal line of the transmission interface, to receive an audio input signal of the audio source device;

a second signal port, configured to be coupled to an audio ground line of the transmission interface, to connect to an audio ground level of the audio source device through the audio ground line of the transmission interface;

a power supply port, configured to be coupled to a power supply line of the transmission interface, to generate a power supply level to the power supply line;

a power ground port, configured to be connected to a ground level and coupled to a power ground line of the transmission interface, to connect to a ground level of the audio source device; and an amplifier circuit, having a first input terminal coupled to the first signal port to receive the audio input signal, having a second input terminal coupled to the second signal port to connect to the audio ground level through the audio ground line, and having an output terminal configured to generate an amplified audio signal according to the audio input signal and the audio ground level, wherein the amplified audio signal is capable of being played by the audio receiver;

wherein when the audio receiver is outputting a power supply current to the audio source device through the power supply port via the power supply line, a connection state between the second signal port and the power ground port is at a high impedance state.

2. The audio receiver of claim 1, further comprising:

a noise canceling circuit, coupled to the second signal port, the power supply port and the power ground port, and configured to refer to whether the audio source device is currently being charged, to dynamically determine whether the connection state between the second signal port and the power ground port is still at the high impedance state to prevent a voltage level of the second signal port from dissipating to the ground level or the connection state between the second signal port and the power ground port is at a low impedance state to dissipate the voltage level of the second signal port to the ground level.

3. The audio receiver of claim 2, wherein the noise canceling circuit comprises:

a switch circuit, coupled between the second signal port and the power ground port, wherein when the audio receiver outputs the power supply current through the power supply port to charge the audio source device, the switch circuit is at the high impedance state to prevent the voltage level of the second signal port from dissipating to the ground level, and when the audio receiver does not output the power supply current through the power supply port, the switch circuit is at the low impedance state, such that the voltage level of the second signal port dissipates to the ground level.

4. The audio receiver of claim 3, further comprising:

a current sensing circuit, having a sensing input terminal coupled to the power supply port to detect whether the power supply current is outputted, and having a sensing output terminal for generating a control signal to control the switch circuit;

wherein when the current sensing circuit detects the power supply current, the control signal controls the switch circuit to be at the high impedance state, and when the current sensing circuit does not detect the power supply current, the control signal controls the switch circuit to be at the low impedance state.

5. An audio receiver, for being coupled to an audio source device through a transmission interface, the audio receiver comprising:
- a first signal port, configured to be coupled to an audio signal line of the transmission interface to receive an audio input signal of the audio source device;
- a second signal port, configured to be coupled to an audio ground line of the transmission interface, to connect to an audio ground level of the audio source device through the audio ground line of the transmission interface;
- a power supply port, configured to be coupled to a power supply line of the transmission interface, to generate a power supply level to the power supply line;
- a power ground port, configured to be connected to a ground level and coupled to a power ground line of the transmission interface, to connect to a ground level of the audio source device; and
- an amplifier circuit, having a first input terminal coupled to the first signal port to receive the audio input signal, having a second input terminal coupled to the second signal port to connect to the audio ground level through the audio ground line, and having an output terminal configured to generate an amplified audio signal according to the audio input signal and the audio ground level, wherein the amplified audio signal is capable of being played by the audio receiver;
- wherein when the power supply port of the audio receiver is not outputting a power supply current and the audio receiver does not detect any audio input signal on the first signal port, a connection state between the second signal port and the power ground port is at a low impedance state to dissipate a voltage level of the second signal port to the ground level.

6. A method for an audio receiver, the audio receiver being configured to be coupled to an audio source device through a transmission interface, the method comprising:
- providing a first signal port that is coupled to an audio signal line of the transmission interface to receive an audio input signal of the audio source device;
- providing a second signal port that is coupled to an audio ground line of the transmission interface, to connect to an audio ground level of the audio source device through the audio ground line of the transmission interface;
- providing a power supply port that is coupled to a power supply line of the transmission interface, to generate a power supply level to the power supply line;
- providing a power ground port that is connected to a ground level and coupled to a power ground line of the transmission interface, to connect to a ground level of the audio source device;
- providing an amplifier circuit, using a first input terminal of the amplifier circuit to receive the audio input signal, using a second input terminal of the amplifier circuit to connect to the audio ground level through the audio ground line, and generating an amplified audio signal according to the audio input signal and the audio ground level, wherein the amplified audio signal is capable of being played by the audio receiver; and
- when the audio receiver is outputting a power supply current to the audio source device through the power supply port via the power supply line, controlling a connection state between the second signal port and the power ground port to be at a high impedance state.

7. The method of claim 6, further comprising:
- referring to whether the audio source device is currently being charged, to dynamically determine whether the connection state between the second signal port and the power ground port is still at the high impedance state to prevent a voltage level of the second signal port from dissipating to the ground level or the connection state between the second signal port and the power ground port is at a low impedance state to dissipate the voltage level of the second signal port to the ground level.

8. The method of claim 7, further comprising:
- providing a switch circuit that is coupled between the second signal port and the power ground port;
- when the audio receiver is outputting the power supply current through the power supply port to charge the audio source device, controlling the switch circuit to be at the high impedance state to prevent the voltage level of the second signal port from dissipating to the ground level; and
- when the audio receiver is not outputting the power supply current through the power supply port, controlling the switch circuit to be at the low impedance state, such that the voltage level of the second signal port dissipates to the ground level.

9. The method of claim 8, further comprising:
- when detecting the power supply current on the power supply port, controlling the switch circuit to be at the high impedance state; and
- when not detecting the power supply current on the power supply port, controlling the switch circuit to be at the low impedance state.

* * * * *